United States Patent
Wischermann

(10) Patent No.: US 7,061,546 B2
(45) Date of Patent: Jun. 13, 2006

(54) ARRANGEMENT FOR PROCESSING VIDEO SIGNALS

(75) Inventor: Gerhard W. Wischermann, Weiterstadt (DE)

(73) Assignee: BTS Media Solutions GmbH, Weiterstadt (DE)

( * ) Notice: Subject to any disclaimer, the term of this patent is extended or adjusted under 35 U.S.C. 154(b) by 387 days.

(21) Appl. No.: 10/126,926

(22) Filed: Apr. 19, 2002

(65) Prior Publication Data

US 2002/0158988 A1 Oct. 31, 2002

(30) Foreign Application Priority Data

Apr. 20, 2001 (EP) .................. 01109747

(51) Int. Cl.
*H04N 5/14* (2006.01)
(52) U.S. Cl. .................. 348/571
(58) Field of Classification Search ........... 348/606, 348/607, 627, 412.1, 415.1; 382/260
See application file for complete search history.

(56) References Cited

U.S. PATENT DOCUMENTS

| | | | | |
|---|---|---|---|---|
| 4,488,251 A | * | 12/1984 | Wischermann | 708/319 |
| 4,740,842 A | * | 4/1988 | Annegarn et al. | 348/452 |
| 4,994,906 A | * | 2/1991 | Moriwake | 348/664 |
| 5,148,278 A | * | 9/1992 | Wischermann | 348/609 |
| 5,512,956 A | * | 4/1996 | Yan | 348/606 |
| 5,519,453 A | * | 5/1996 | Wischermann | 348/620 |
| 5,535,246 A | * | 7/1996 | Beech | 375/285 |
| 5,543,858 A | * | 8/1996 | Wischermann | 348/618 |
| 5,715,000 A | * | 2/1998 | Inamori | 348/241 |
| 5,838,377 A | * | 11/1998 | Greene | 375/240.11 |
| 6,094,231 A | * | 7/2000 | Wischer-Mann | 348/607 |
| 6,259,489 B1 | * | 7/2001 | Flannaghan et al. | 348/620 |
| 6,570,673 B1 | * | 5/2003 | Kishimoto | 358/1.2 |
| 6,744,818 B1 | * | 6/2004 | Sheraizin et al. | 375/240.29 |
| 6,771,835 B1 | * | 8/2004 | Han et al. | 382/260 |

* cited by examiner

*Primary Examiner*—Paulos M. Natnael
(74) *Attorney, Agent, or Firm*—Joseph J. Laks; Robert B. Levy; Jorge Tony Villabon

(57) ABSTRACT

An arrangement for processing video signals comprises at least one linear filter and at least one non-linear filter with inputs for an input signal and selection means for receiving output signals of the at least one linear and of the at least one non-linear filter and for generating a selected output signal which corresponds to a selected one of the output signals whereby the selection is performed according to a predetermined rank order. The arrangement can be used in various video signal processing applications, especially image restoration or noise reduction, image or pattern recognition, image compression, image enhancement (contour sharpening or softening), image interpolation (up or down sampling), and flicker compensation.

10 Claims, 3 Drawing Sheets

US 7,061,546 B2

ARRANGEMENT FOR PROCESSING VIDEO SIGNALS

FIELD OF THE INVENTION

The invention relates to an arrangement for processing video signals.

BACKGROUND OF THE INVENTION

For processing video signals different types of filters are known. Often used are filters wherein different numbers of samples or pixels respectively form a filter window. In linear filters the value of these samples are evaluated by filter coefficients and added. The samples can be taken from one line or different lines within the same frame. Such filters are called spatial filters. Temporal filters use samples from different frames. Linear filters can be FIR filters (finite response filters) or recursive filters.

A further group of filters comprises non-linear filters whereby the combination of the values of the samples is not performed by a linear operation. One of these filters is the median filter, which outputs the value which ranks in the middle of all values in the window. Other non-linear filters produce the maximum or the minimum value or non-linear combinations of values covered by the window.

The known filters have different properties and are used for different purposes. Besides the property, which is used for a special purpose other properties of the same filter may cause disturbances. E.g. FIR filters can be used as low-pass filter without generating alias frequencies. However they introduce a certain rise time to edges, so sharp transitions will be blurred.

SUMMARY OF THE INVENTION

It is an object of the inventive arrangement to process video signals using the useful properties of filters without having the video signals disturbed as far as possible. This inventive object is achieved in an arrangement comprising at least one linear filter and at least one non-linear filter with inputs for an input signal, selection means for receiving output signals of the at least one linear and of the at least one non-linear filter and for generating a selected output signal which corresponds to a selected one of the output signals whereby the selection is performed according to a predetermined rank order.

Preferably the at least one linear filter and the at least one non-linear filter are high-pass filters.

Some of the known filters mentioned above form in principle low-pass filters. Therefore an advantageous embodiment of the invention is arranged so that the high-pass filters are formed by low-pass filters and means for subtracting the output signal of the respective low-pass filter and a delayed input signal.

The inventive arrangement can be used in various video signal processing applications, especially image restoration or noise reduction, image or pattern recognition, image compression, image enhancement (contour sharpening or softening), image interpolation (up or down sampling), and flicker compensation.

As linear and non-linear filters all known types whereof as mentioned above can be used depending on the respective application.

For the purposes of noise reduction and image enhancement a further development of the inventive arrangement is especially useful wherein the linear filter is an FIR filter and the non-linear filter is a median filter and wherein the output signals of the subtracting means are supplied to the selection means which generates a selected output signal corresponding to that of the output signals of the subtracting means which has the lowest absolute value at the time. This arrangement provides a high-pass output signal. If an output signal with low-pass characteristic is wanted the arrangement can be designed so that the selected output signal and the delayed input signal are subtracted in order to form a selected low-pass output signal.

At a preferred embodiment of this arrangement said filters are spatial filters having taps corresponding to horizontally and/or vertically displaced pixels. For some applications, e.g. noise reduction this arrangement can comprise temporal filter components too.

Especially in the field of film scanning reducing flicker effects is important. For this purpose a further development of the inventive arrangement is proposed wherein the linear filter is an FIR filter and the non-linear filter is a median filter and wherein the output signals of the subtracting means are supplied to the selection means which generates a selected output signal corresponding to that of the output signals of the subtracting means which has the highest absolute value at the time.

The output of this arrangement provides a signal, which represents the flicker effects. For reducing the flicker effect the selected output signal and the delayed input signal are subtracted in order to form a selected low-pass output signal with reduced flicker components.

Especially for reducing flicker effects in this further development said filters temporal filters having taps corresponding to different frames of the video signals.

In an advantageous embodiment a further temporal FIR filter is provided which has two taps spaced by two frames. This measure improves the flicker reduction at low frequencies.

BRIEF DESCRIPTION OF THE DRAWINGS

Numerous forms of design of the invention are possible. Some of these are described below and are schematically illustrated in the drawings, which comprise a plurality of figures. Shown are, in FIG. 1 a general embodiment of the invention comprising a non-specified number of filters, FIG. 2 a similar embodiment with some additional components, FIG. 3 an embodiment for noise reduction and image enhancement applications, FIG. 4 time diagrams of signals of the embodiment according to FIG. 3, FIG. 5 an embodiment for reducing flicker, and FIG. 6 time diagrams of signals of the embodiment according to FIG. 5.

DETAILED DESCRIPTION OF PREFERRED EMBODIMENTS

Although the embodiments of the invention are shown in form of block diagrams the invention can be realized by means of programmable devices like gate arrays and EPLDs.

Figure 1:
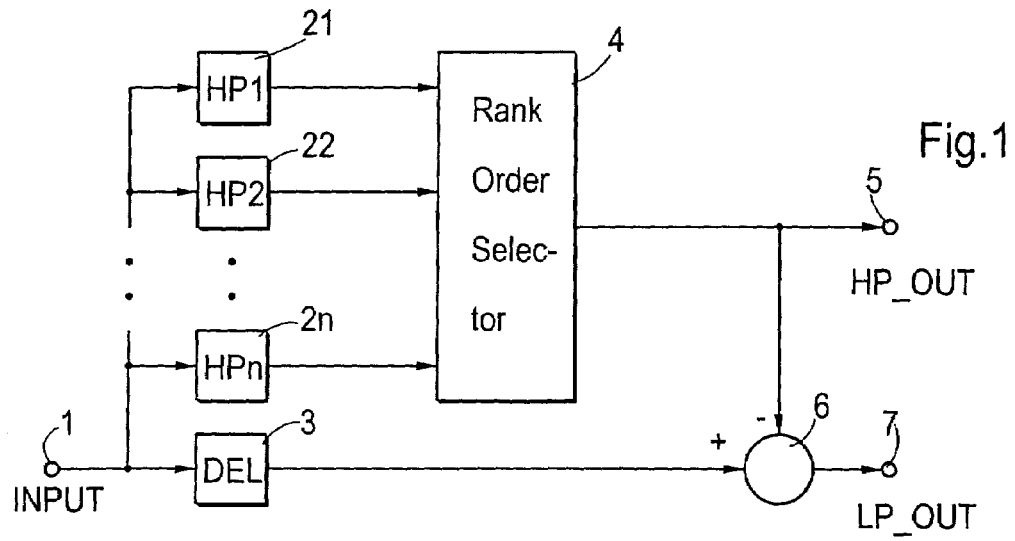

The arrangement according to FIG. 1 comprises one input 1 being connected to inputs of a plurality of high-pass filters 21, 22 to 2n and delay means 3. According to the invention the filters 21 to 2n comprise at least one linear filter and one non-linear filter. The outputs of the high-pass filters 21 to 2n are connected to inputs of a rank order selector 4, the output of which forms an output 5 of the arrangement. The output signal of the rank order selector 4 and the delayed input signal are subtracted at 6. The difference is a low-pass output signal LP_OUT at a further output 7. The rank order selector can be based on different rank orders e.g. as a minimum filter, a median filter or a maximum filter.

Figure 2:
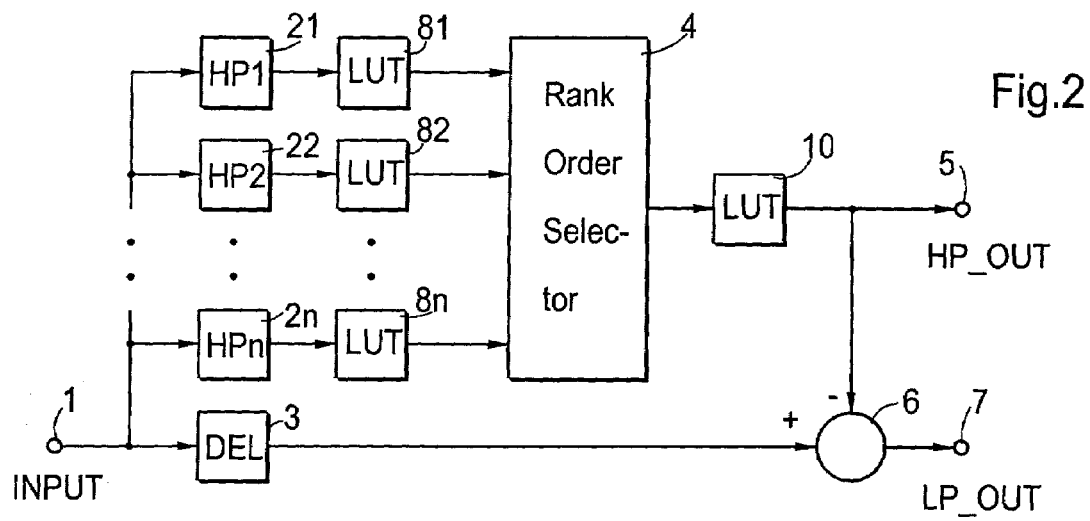

Additional to the components of the arrangement according to FIG. 1 the arrangement according to FIG. 2 comprises look-up tables 81 to 8n, 9 in order to introduce specific amplitude characteristics such as a coring characteristic, whereby lower amplitudes pass unchanged whereas larger amplitudes are rejected, or—to the contrary—characteristics where lower amplitudes are suppressed and larger amplitudes are transmitted linear.

If it is desired to build a filter arrangement that emphasizes higher frequencies or sharpens edges the high-pass signal HP_OUT can be added instead of subtracted as shown in FIG. 2.

Figure 3:
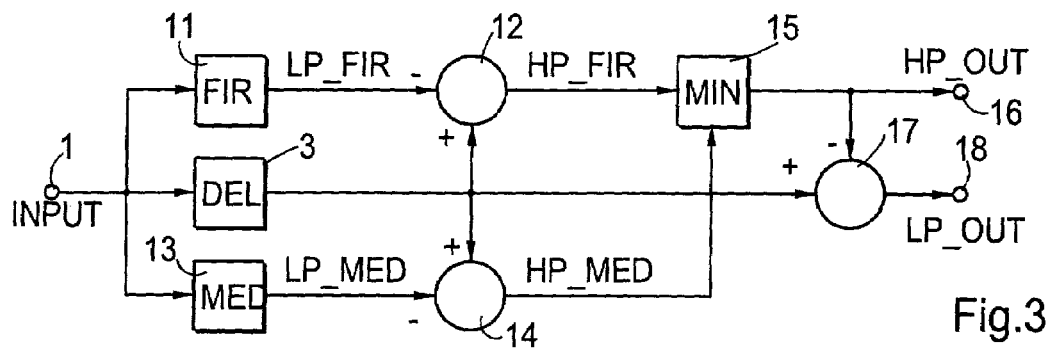

FIG. 3 shows an embodiment where a first high-pass filter is formed by an FIR filter, which has low-pass characteristic and subtracting means 12 and a second high-pass filter is formed by a median filter 30 and further subtracting means 14.

The output signals of the subtracting means 12, 14 are supplied to a rank order selector 15 which selects that one of the signals HP_FIR and HP_MED which has the minimum absolute value. The output of the selector 15 is connected to an output 16, which carries the output signal HP_OUT and to further subtracting means 17 which form a low-pass output signal LP_OUT at a further output 18.

Figure 4:
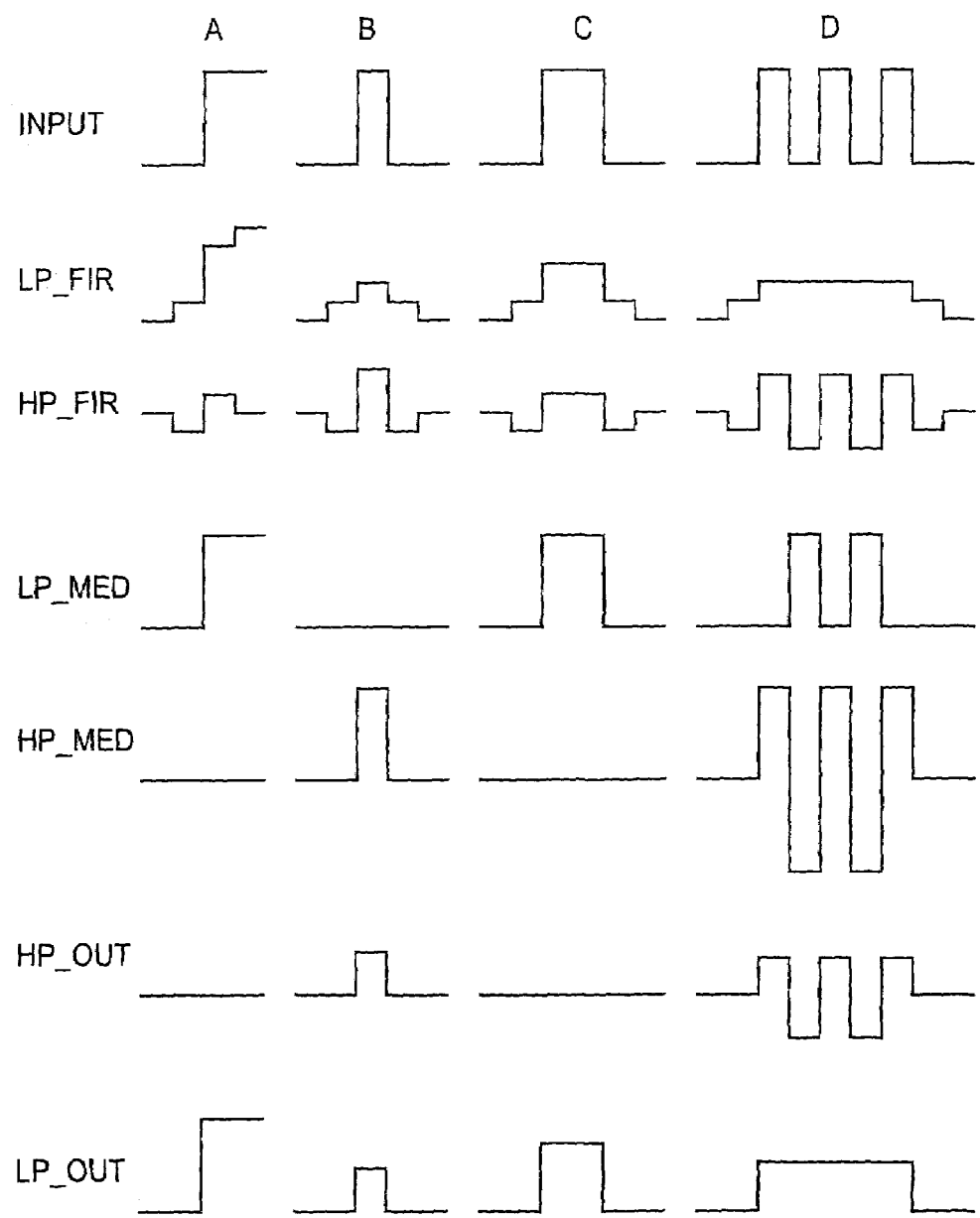

In the following the function of the embodiment according to FIG. 3 is explained by means of time diagrams shown in FIG. 4 The lines of FIG. 4 are labled according to FIG. 3, the columns of the diagrams of FIG. 4 display the signals for different wave forms of the input signal. Column A shows the function of the embodiment after applying an input signal with a separate edge, column B with a single pulse, column C with a double pulse and column D with a periodic input signal.

The output signal LP_FIR of the FIR filter 11 (FIG. 3) shows the typical low-pass response especially blurring of edges. The corresponding high-pass signal HP_FIR is the difference of the input signal and LP_FIR. The median filter outputs the input signal unchanged in the cases A and C, while in the case B the single pulse is suppressed and in case D one of the three pulses is suppressed. After subtracting from the input signal the signal HP_MED is zero in the cases A and C corresponds to the input signal in case B and shows a typically high-pass characteristic in case D.

The operation of the selector 15 results in a HP_OUT signal, which is zero for cases A and C. In the cases B and D HP_OUT constitutes a mixture of the signals HP_FIR and HP_MED in so far that the signal form in this example corresponds to HP_MED whilst the amplitudes are taken from HP_FIR.

The last line of the diagrams of FIG. 4 shows the low-pass output signal LP_OUT where the signal edges are unchanged in the cases A, B, and C. In the cases B and C the amplitude is reduced. The input signal according to case D is filtered in such a way that LP_OUT has only one pulse with the total length of the three pulses including the intervals between the pulses of the input signal.

It can be seen that the inventive arrangement behaves like a median filter if the input signal is a sharp transition (case A). The edge is not blurred and no over or under shorts are introduced.

For a single pulse (case B) at the input the response is mixed one between linear and non-linear behavior. The amplitude is reduced down to 50%, but the pulse width is not spread.

The double pulse (case C, two sample intervals wide) passes the filter unchanged. The inventive arrangement behaves like the basic median filter 13 (FIG. 3).

Finally the periodic input signal (case D) is considered. The response of the combined filter now clearly tends to linear behavior. The repeated pulses are suppressed and only the average DC value passes through the filter. The behavior is even better than both filters have in stand alone mode, because the response is not widened in temporal direction.

Figure 5:
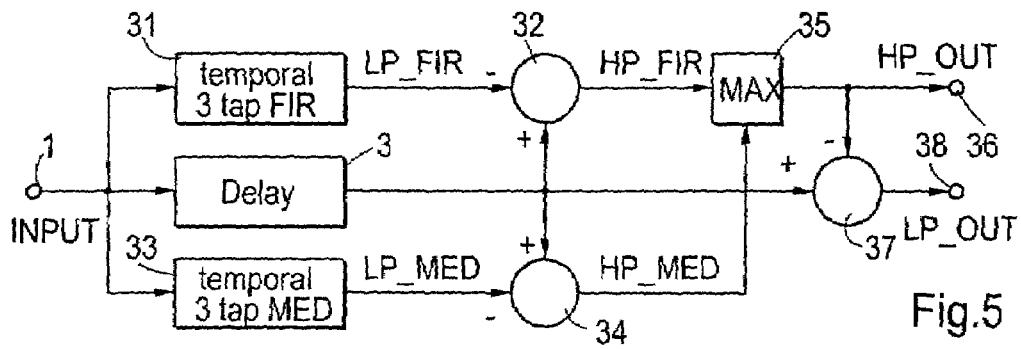

FIG. 5 shows an arrangement according to the invention for reducing flicker effects in a sequence of moving images. Flicker is an overlaying modulation in brightness of the whole picture or larger parts of the picture. It can be introduced by flickering lamps during shooting the film, or during the process of copying, or by improper archiving the film material.

As flicker is a temporal variation of the mean picture brightness, a temporal low-pass filter is suited for reducing this kind of artifact. An averaging over three subsequent frames has proved to give a significant improvement in picture quality. For this purpose a 3 tap median filter 32 and a 3 tap FIR filter 31 are used. At 35 the maximum absolute value of the signals HP_FIR and HP_MED is produced. As in FIG. 3 the output signal of the selector 35 is the high-pass output signal HP_OUT at 36 and is subtracted from the delayed input signal at 37 forming a low-pass output signal LP_OUT at 38.

Figure 6:
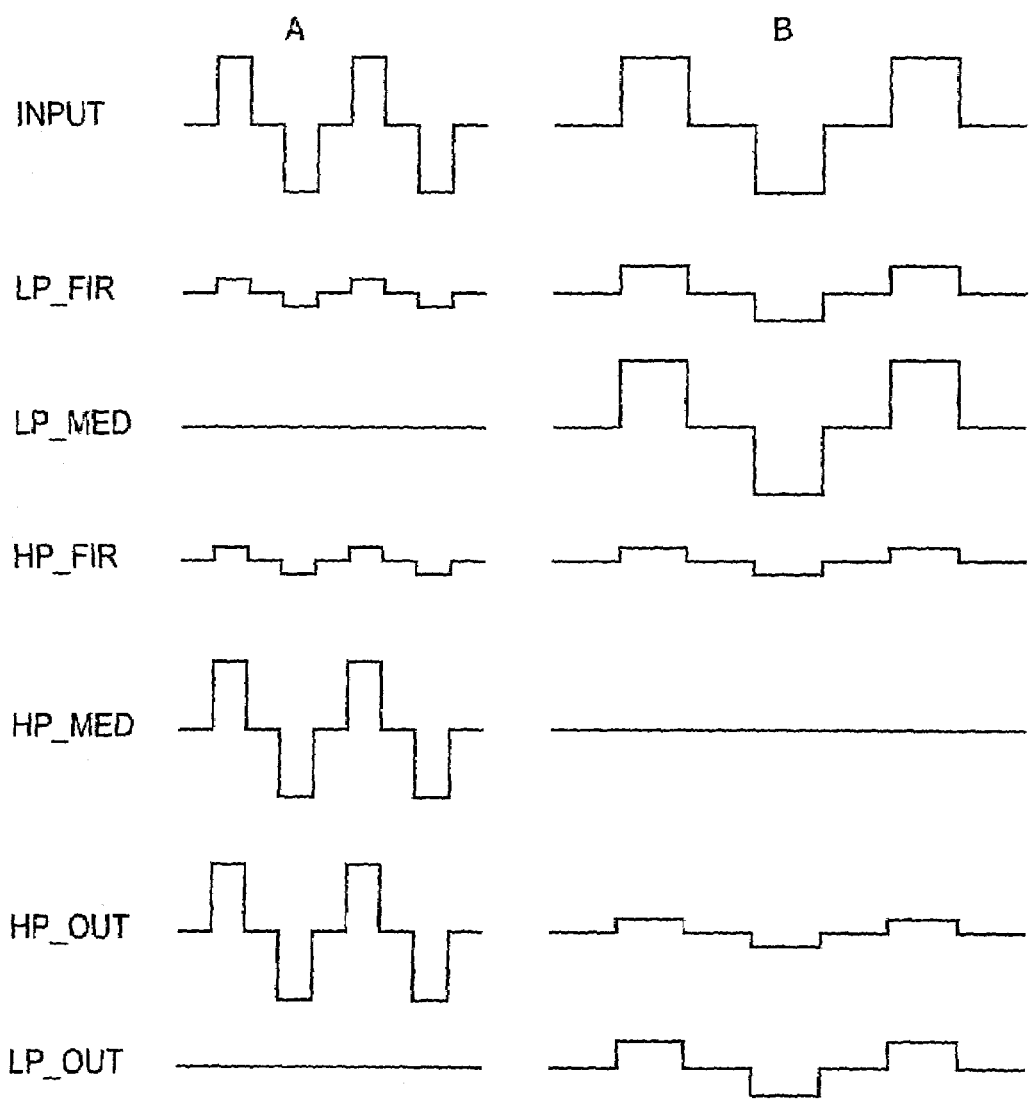

FIG. 6 shows diagrams of signals occurring in the arrangement according to FIG. 5 for a higher and a lower flicker frequency (case A and B). In case A the flicker component INPUT has the amplitudes zero, positive, zero, negative a.s.o. for one frame each. In case B the flicker component remains on each amplitude level for two frames. In order to simplify the presentation the picture content is assumed to be zero (or constant), and only the variation of the brightness from frame to frame is shown in the diagram. In order to fulfill this assumption in a practical implementation the image signal should split into a spatial low-pass and high-pass component, and only the low-pass signal is processed by the arrangement of FIG. 5. The arrangement shown in FIG. 3 could be used advantageously for splitting the image signal into a high frequency and a low frequency (or low detail) component.

According to FIG. 5 the temporal high-pass signals HP_FIR and HP_MED are derived by subtracting the individual low-pass components LP_FIR and LP_MED from the input signal. The maximum of both results in the high-pass output HP_OUT of the arrangement. The high-pass output isolates the flicker components, which are to be subtracted from the input signal in order to perform the desired flicker reduction.

FIG. 6 shows that flicker with a high frequency can be reduced better with a median filter, whereas the FIR filter performs better with a lower flicker component.

The 3 tap median filter is able to cancel single frames (case A) with either positive or negative variations of the intensity, whereas the FIR filter just gives a reduction of 66%.

If the flicker frequency gets lower, the median filter stops working as soon as two subsequent frames have the same intensity of flicker (case B). But the FIR filter still produces a mean intensity LP_FIR, which is still 33% below the original value. So the FIR high-pass filter isolates more low frequency flicker HP_FIR than the median filter HP_MED.

As the maximum value of both high-pass filters is taken for extracting flicker components the inventive arrangement is always able to perform the best reduction by either the median or the FIR filter.

In FIG. 3 the final high-pass signal was taken as the minimum value in order to avoid softening of edges. Taking the maximum value now for the flicker filter will result in some motion blur, but this is not a serious problem, as flicker reduction is done only with the low frequency (or low detail) component of the image as discussed above. So taking the maximum in case of the flicker filter according to FIG. 5 gives the optimum result for reducing temporal variations of moving images.

The invention claimed is:

1. Arrangement for processing video signals comprising:
   at least one high-pass linear filter and at least one high pass non-linear filter with inputs for an input signal;
   a selection means for receiving output signals of the at least one high-pass linear filter and of the at least one high-pass non-linear filter and for selecting one of the received output signals, wherein the selection is performed according to a predetermined rank order which depends on the received output signals; and
   wherein the high-pass filters are formed by respective low-pass filters and a means for subtracting the output signal of the respective low-pass filter and a delayed input signal.

2. Arrangement according to claim 1 wherein the linear filter is an FIR filter and the non-linear filter is a median filter and wherein the output signals of the subtracting means are supplied to the selection means, which generates a selected output signal corresponding to that of the output signals of the subtracting means, which has the lowest absolute value at the time.

3. Arrangement according to claim 2 wherein the selected output signal and the delayed input signal are subtracted in order to form a selected low-pass output signal.

4. Arrangement according to claim 2 wherein said filters are spatial filters having taps corresponding to horizontally and/or vertically displaced pixels.

5. Arrangement according to claim 3 wherein said filters are spatial filters having taps corresponding to horizontally and/or vertically displaced pixels.

6. Arrangement according to claim 1 wherein the linear filter is an FIR filter and the non-linear filter is a median filter and wherein the output signals of the subtracting means are supplied to the selection means which generates a selected output signal corresponding to that of the output signals of the subtracting means which has the highest absolute value at the time.

7. Arrangement according to claim 6 wherein the selected output signal and the delayed input signal are subtracted in order to form a selected low-pass output signal.

8. Arrangement according to claim 6 wherein said filters temporal filters having taps corresponding to different frames of the video signals.

9. Arrangement according to claim 7 wherein said filters temporal filters having taps corresponding to different frames of the video signals.

10. Arrangement according to claim 9 wherein a further temporal FIR filter is provided, which has two taps spaced by two frames.

* * * * *